United States Patent
Klein et al.

(10) Patent No.: US 6,401,171 B1
(45) Date of Patent: Jun. 4, 2002

(54) METHOD AND DEVICE FOR STORING AN IP HEADER IN A CACHE MEMORY OF A NETWORK NODE

(75) Inventors: Philippe Klein, La Gaude; Jean-Claude Dispensa, Saint-Jeannet, both of (FR); Alexandre Jay, Montreal (CA); Jean-Philippe Loison, Carros Village (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/261,604

(22) Filed: Feb. 26, 1999

(30) Foreign Application Priority Data

Feb. 27, 1998 (EP) .............................. 98480009

(51) Int. Cl.⁷ .............................................. G06F 12/00
(52) U.S. Cl. ...................... 711/118; 709/216; 709/238; 709/245; 370/351; 370/474
(58) Field of Search ......................... 711/118; 709/212, 709/216, 238, 243, 245; 370/474, 476, 351, 381, 412, 489

(56) References Cited

U.S. PATENT DOCUMENTS

| | | | | |
|---|---|---|---|---|
| 5,105,424 A | * | 4/1992 | Flaig et al. ................ | 370/94.1 |
| 5,398,245 A | * | 3/1995 | Harriman, Jr. ............. | 370/94.1 |
| 5,566,170 A | | 10/1996 | Bakke et al. ................ | 370/60 |
| 5,673,263 A | | 9/1997 | Basso et al. | |
| 5,781,715 A | | 7/1998 | Sheu ..................... | 395/182.02 |
| 5,881,242 A | | 3/1999 | Ku et al. | |
| 5,895,485 A | * | 4/1999 | Loechel et al. ............. | 711/119 |
| 5,941,988 A | | 8/1999 | Bhagwat et al. ............ | 713/201 |
| 5,978,951 A | * | 11/1999 | Lawler et al. .............. | 714/758 |
| 6,032,190 A | * | 2/2000 | Bremer et al. ............. | 709/238 |
| 6,067,569 A | | 5/2000 | Khaki et al. ................ | 709/224 |
| 6,240,461 B1 | * | 5/2001 | Cieslak et al. ............. | 709/235 |

* cited by examiner

*Primary Examiner*—Matthew Kim
*Assistant Examiner*—Pierre M. Vital
(74) *Attorney, Agent, or Firm*—Cesari and McKenna, LLP; A. Sidney Johnston

(57) ABSTRACT

Method and device for caching the IP header of a message being routed through a data transmission network wherein each node includes a route processor for computing a routing algorithm, a main memory for storing the message, a cache memory; and an IP header detection logic circuit for storing the header in the cache memory as the message is being stored in the main memory. Once the header has been stored in the cache memory, it can be read from the cache memory in order to compute the routing algorithm. The new header resulting from the routing computation is written into the cache memory and is then read from the cache memory when the message including the header and the message data is sent over the network.

19 Claims, 2 Drawing Sheets

METHOD AND DEVICE FOR STORING AN IP HEADER IN A CACHE MEMORY OF A NETWORK NODE

TECHNICAL FIELD

The present invention relates to data communication networks wherein data messages are routed from node to node and particularly to a method and a device for storing an IP header in the cache memory of a data communication network node.

BACKGROUND OF THE INVENTION

One way to improve processing performance in a network node is to add a fast cache memory to the node to work jointly with the node's main memory.

When a node having a cache memory generates a request for data stored at a particular main memory address, the request is directed first to the cache memory. The cache memory controller checks to see if the requested data is already stored in the cache memory. If it is (a cache hit), the data is supplied from cache memory instead of main memory, which reduces the memory fetch time. If the cache memory does not include the requested data (a cache miss), the request is forwarded to main memory which returns the addressed data to the node's data processing logic. Where data must be retrieved from main memory, the the data and its associated address are written into the cache memory during the retrieval step so that future requests for the data may be filled from cache memory, rather than main memory.

A node in a data communication network that handles Internet Protocol (IP) data traffic generally includes a cache memory associated with the main memory. When a message is received by the node, the following steps are conventionally performed:

1. The whole message, comprising an IP header and the data, is stored in the main memory.
2. Assuming the IP header is not already stored in cache memory, the node processor reads the IP header from the main memory and computes the IP routing algorithm. The cache memory controller uses this memory access to write the IP header into a cache memory cell.
3. Then the node processor writes the new IP header to the main memory and the cache memory updates the matching cache memory cell.
4. Finally, the complete message, that is, data retrieved from main memory and the related IP header retrieved from the cache memory is sent over the network.

SUMMARY OF THE INVENTION

An object of the invention is to provide a method and a device for writing an IP if header in a received message into cache memory of a network node concurrently with the first main memory write operation.

The invention relates to a method of storing a message header such as a IP header in a cache memory, this method being implemented in a data transmission network having a plurality of nodes wherein messages including a header and data are routed from node to node along a transmission route and wherein each node includes processing means for computing a routing algorithm by using the header of a message received by the node and routing the message to another node by using the resulting information, a main memory for storing the message and a cache memory. Such a method comprises the steps of storing the header in the cache memory while it is being stored in the main memory, reading the header from the cache memory in order to compute the routing algorithm, writing a new header resulting from the routing algorithm into the cache memory, and reading the new header from the cache memory and the message data stored in the main memory to enable the routing of a message including the header and the message data over the network.

According to another aspect, the invention relates to a device for storing in a cache memory of a node the IP header of a message routed from node to node in a data transmission network wherein each node includes a processor for computing a routing algorithm by using the header and routing the message by using the resulting information, a main memory for storing the message, a cache memory; and header a detector logic for checking whether the message conforms to a predetermined protocol such as IP protocol and cache control logic for storing the header in the cache memory concurrently with its storage in the main memory.

BRIEF DESCRIPTION OF THE DRAWINGS

The objects, features and other characteristics of the invention will become more evident from the following detailed description with reference to the accompanying drawings, in which.

DETAILED DESCRIPTION OF THE INVENTION

Figure 1:
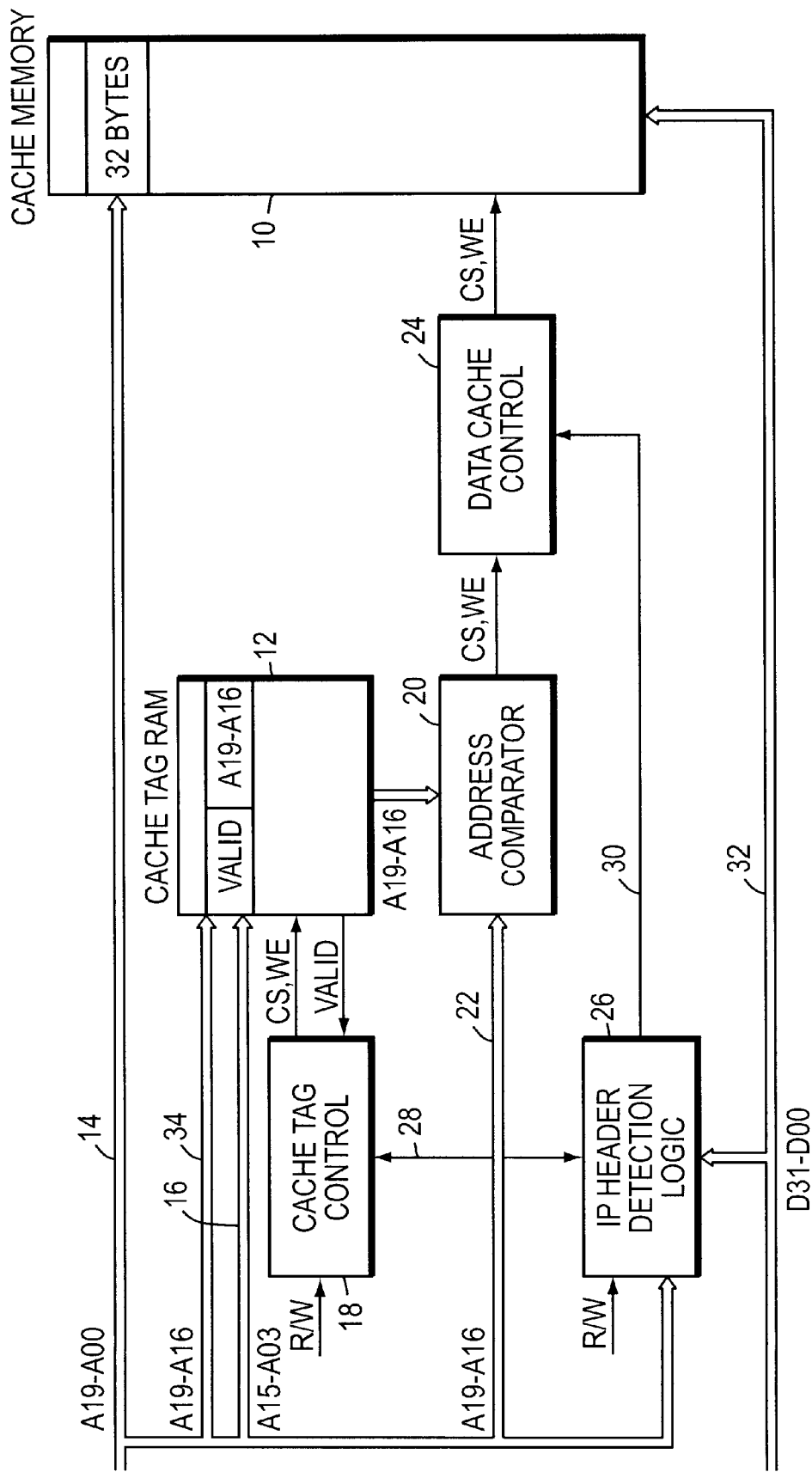
FIG. 1 shows a block diagram of an apparatus for implementing the present invention.

The system shown in FIG. 1 comprises a cache memory 10 divided into a number of cache memory cells and a cache tag RAM 12 used for addressing the cache memory 10. In a preferred embodiment of the invention, cache memory 10 has a capacity of 256 kilobytes and is divided into $2^{13}$ or 8192 cells, each capable of storing bytes of information as eight 4-byte words.

Since the cache memory has $2^{13}$ separate cells, it follows that cache tag RAM 12 can uniquely identify any one of those cells if provided with 13 bits of address information. The cache tag RAM 12 itself does not actually store the address bits used to identify the cache memory cells. When a cache memory cell is being used to cache information, an associated cell in cache tag RAM 12 is used to store a "VALID" bit plus a 4-bit word that contains the four most significant bits of a complete main memory address which has the 13 bits of address information used to identify the cache memory cell.

Specifically, a node's address bus 14 normally comprises 20 bits A19–A00 of address information, which would permit addressing of $2^{20}$ separate memory locations or cells in main memory. Since the cache memory has only $2^{13}$ separate memory locations, it is not necessary to use all 20 bits of available addressing information in addressing the cache memory. The least significant three bits A02–A00 on the address bus 14 are ignored in addressing the cache memory locations. The most significant four bits A19–A16 of a given 20 bit address are not used in addressing the cache tag RAM, but instead may be stored along with a "VALID" bit value in the cache tag RAM location identified from address bits A15–A03.

The system shown in FIG. 1 further includes a cache tag control 18 to control read and write operations in cache tag RAM 12, an address comparator 20 to compare the most significant bits (A19–A16) of an address provided on an address sub-bus 22 with four bits of the contents of a cache tag RAM 12 location identified by bits A15–A03 of an address, a data cache control 24 to control read and write operations in cache memory and IP header detection logic 26, a significant element of the invention.

Every time a new message is received from the network, it is stored in the main memory using a complete 20 bit address (A19–A00). Simultaneously, a series of operations are initiated to determine whether the message is an IP header which may also be written into an available cache memory cell identified by 13 bits (A15–A03) of the complete 20 bit message address.

As the message is being received on lines D31–D00 of a data bus 32, IP header detection logic 26 checks to see whether the message may be an IP header by comparing the value of the most significant byte of the message to a known hexadecimal value (45 hex) always found in the most significant byte position in a valid IP header. For messages conforming to protocols other than an IP protocol, the most significant byte position would have a different value. As is noted below, a successful byte comparison only tentatively identifies the message as an IP header. Final identification of a message as an IP header requires further tests, which will be described in detail.

If the byte comparison tentatively indicates the message is an IP header, detection logic 26 sends an enabling signal to cache tag control 18 through line 28. The cache tag control 18 activates its read line CS,WE, which results in interrogation of the cache tag RAM location identified by simultaneously applied address bits A15–A03. As a result of this interrogation, the binary number (0 or 1) stored at the "VALID" bit position of the interrogated location is returned to the cache tag control 18.

A returned VALID bit value of 1 indicates that the cache memory cell identified by address bits A15–A03 is already in use and no further attempt is made to cache the current message tentatively identified as an IP header. If, on the other hand, the returned value of the VALID bit position in the interrogated cache tag RAM location is zero, then the corresponding cache memory cell is available. In such a case, cache tag control 18 sends an enabling signal to the IP header detection logic 26. This enabling signal causes detection logic 26 to perform checksum operations on the header for the purpose of finally confirming the message is an IP header.

If the checksum result matches the value of predetermined header bytes, the message is confirmed as an IP header and the IP header detection logic 26 orders cache tag control 18, to write the content of the most significant bits A19–A16 of the address on the address sub-bus 34 to the cache tag RAM location identified by address bits A15–A03 on sub-bus 16 and to change the VALID bit content in that location to 1. At the same time, the IP header detection logic 26 sends a signal over output line 30 to activate data cache control 24 so as to write the header data located on data bus 32 to the cache memory cell identified by the address bits A15–A03.

If, on the other hand, the checksum value does not match the value of the predetermined bytes, the message is assumed not to be an IP header. In such a case, IP header detection logic 26 orders cache tag control 18 to maintain a zero value for the VALID bit, disabling the content of the related cache memory cell.

When the node processor computes the routing algorithm for a received lit message, it first seeks the IP header for the message in cache memory without accessing the main memory. To this end, cache tag control 18 activates its CS,WE line to retrieve the four bit word stored in cache tag RAM 12 at the 13 bit address provided on address sub-bus 16. The 4 bit word returned from cache tag RAM 12 is compared (in address comparator 20) to the most significant bits A19–A16 appearing on address sub-bus 22. If this comparison is successful, address comparator 20 activates data cache control 24 causing it to send a read signal for data located in the cell of cache memory 10 addressed by bits A15–A03 of the address located on address bus 14.

When the routing algorithm has been computed, a new IP header is written at the same location in the cache memory to replace the former IP header previously written. As with the read operation described above, the write operation is performed with no need to access the main memory.

Figure 2:
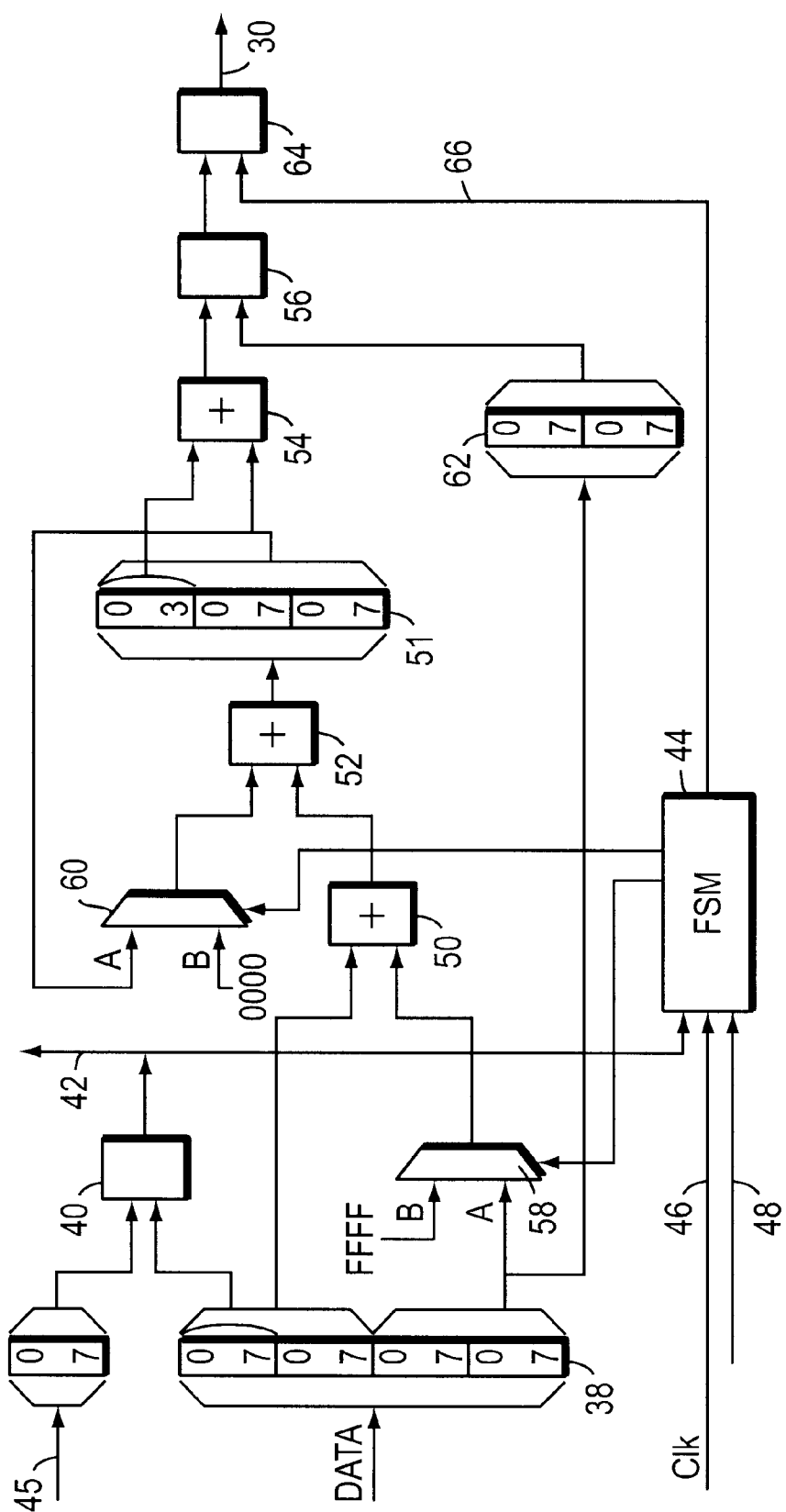
FIG. 2 shows a block diagram of the IP header detection logic included in the apparatus shown on FIG. 1.

A preferred implementation of IP header detection logic 26 is described below reference to FIG. 2. In this embodiment, the header is composed of 20 bytes, but it could consist of up to 32 bytes since cache memory 10 comprises 32-byte cache lines.

An IP header usually comprises a first byte whose value is 45 hex and 2 checksum bytes, that are bytes 10 and 11. The checksum to be tested is the sum of all the header's bytes, except bytes 10 and 11 that are replaced with FFFF hex.

The twenty bytes in the header are sent to an input register 38 in four byte packets over five cycles. As previously seen, the first task performed in logic 26 is to compare the first byte to 45 hex in a comparator 40. If the comparison succeeds, an to enabling signal is sent over comparator output line 42 to,activate a finite state machine 44 (FSM) and to enable cache tag control 18 through line 28. The finite state machine 44 also receives clock signals through line 46 and (through line 48) the signal provided by cache tag control 18 when the value of the VALID bit in cache tag RAM is 0.

During each cycle, the data received in each packet is added in groups of two bytes in an adder 50. The resulting sum is added, in an adder 52, to a previously produced partial sum retrieved from a register 51. The resulting output from adder 52 is added to the carry generated by the adder in an adder 54. The output of adder 54 is sent to a comparator 56 where it is compared to the checksum bytes (bytes 10 and 11) during the third packet cycle.

A multiplexer 58 controlled by the finite state machine 44 enables the two least significant bytes from each group of 4 bytes to be sent to adder 50 (channel A) except during the third cycle when the multiplexer receives the value FFFF hex (channel B) instead of the two checksum bytes 10 and 11. Likewise, a multiplexer 60 also controlled by the finite state machine 44 is used to provide the value 0000 (channel B) during the first cycle and the partial sum (channel A) during the following cycles.

The value of the bytes 10 and 11 loaded in a register 62 is compared to the sum of the header bytes computed as described above. If the latter matches the checksum located in register 62, comparator 56 sends a positive signal to a gate 64. Upon receiving an enabling signal from finite state machine 44 through line 66 at the end of packet cycle 5, gate 64 sends a signal over line 30 to the data cache control to control the writing of the header in the cache memory, as described earlier.

By making use of the IP header detection logic, the apparatus described with reference to FIG. 1 and FIG. 2 permits an IP header to be written into cache memory as it is first being written into main memory.

While a preferred embodiment of the invention is described, variations and modifications will occur to those skilled in the art once they become aware of the invention. Therefore, it is intended that the appended claims shall be construed to include both the preferred embodiment and all such variations and modifications as fall within the true spirit and scope of the invention.

What is claimed is:

1. In a data transmission network having a plurality of nodes wherein messages including a header and data are routed from node to node along a transmission route and wherein each node includes processing means for computing a routing algorithm by using the header of a message received by said node and routing said message to another node by using the resulting information, a main memory for storing said message and a cache memory (10); a method of utilizing the cache memory comprising the steps of:

(a) reading the location in a cache tag ram (12) indexed by a portion of the address of said main memory address at which the message is to be stored so as to determine whether a location in said cache memory corresponding to said portion of said address is free in order to store the header of said message in the cache cell of said cache memory at the location corresponding to said portion of said address when said location is free and storing said header in said cache memory while said header is being stored in said main memory, (b) reading said header from said cache memory in order to compute said routing algorithm, (c) writing a new header resulting from said routing algorithm into said cache memory, and (d) reading said new header from said cache memory and the message data stored in said main memory to enable the routing of a message including said header and said message data over the network.

2. A method according to claim 1, wherein said location in said cache tag ram (12) contains a VALID bit which has a zero value when said location is free.

3. A method according to claim 2, wherein said location in said cache tag ram (12) contains a second portion (A19–A16) of said address.

4. A method according to claim, 3, wherein an IP header detection logic circuit (26) checks whether said message is in accordance with a predetermined protocol such as IP protocol before storing said header in said cache memory (10).

5. A method according to claim 4, wherein said IP header detection logic circuit (26) sends the order to set said VALID bit to 1 and to store said second portion of said address in said cache tag ram (12) location after said IP header detection logic circuit has confirmed that said message conforms to a predetermined protocol.

6. A method according to claim 5, wherein said IP header detection logic circuit (26) confirms that said message conforms to the predetermined protocol by comparing a checksum value computed with all the bytes in said header with the value of one or more of said bytes.

7. Method according to any of claims 1 or 2 to 6, wherein said step a) of reading said location in said cache tag ram (12) is performed only if the first byte of said header has a predetermined value.

8. A device for storing in a cache memory of a node the header of a message routed from node to node in a data transmission network wherein each node includes processing means for computing a routing algorithm by using said header and routing said message by using the resulting information, a main memory for storing said message and a cache memory (10); said device being characterized in that it comprises cache tag ram (12) for determining whether to store said header in said cache memory and header identification means (26) for directing the storage of packet identifying information to cache tag ram (12) and the storage of said header in said cache memory while said message is being stored in said main memory.

9. A device according to claim 8, wherein said header identification means (26) comprise means for checking whether said message conforms to a predetermined protocol before storing said header in said cache memory (10).

10. A device according to claim 8, wherein said means in said header identification means (26) for checking whether said message conforms to a predetermined protocol include means for comparing a checksum computed with all the bytes in said header with the value of one or more of said bytes.

11. A device according to claim 10, wherein said header identification means further comprise means for checking whether the first byte of said header has a predetermined value.

12. A method for caching an IP header in cache memory at network node substantially concurrently with the storage of the header in main memory at the network node where the main memory location is identified by a main memory address, said method comprising the steps of:

a) examining a message as it is received at the network node for the purpose of determining tentatively whether the message conforms to requirements for an IP header;

b) where the message has been determined tentatively to conform to the requirements of an IP header, retrieving the contents of a cache tag RAM to determine whether an associated cache memory cell is available for storage of the header; and c) if the message conforms to the requirements of an IP header and the associated cache memory cell is available, writing the message concurrently into the associated cache memory cell and the main memory.

13. A method as set forth in claim 12 wherein the retrieving step further comprises the steps of:

reading the contents of a location in a cache tag RAM addressed using a subset of the main memory address to which the header is being written;

when the read location contents have a first value, returning a signal which permits the caching operation to continue; and when the read location contents have a second value, returning a signal which permits the main memory write operation to continue without any concurrent caching operation.

14. A method as set forth in claim 13 wherein a caching operation further includes the steps of:

setting at least one bit position in a cache tag RAM to a first binary value indicating the corresponding cache memory cell is being occupied;

writting part of the main memory address into other bit positions in the addressed cache tag RAM.

15. A method as set forth in claim 14 wherein high order bits in the main memory address are written into the cache tag RAM associated with the main memory address.

16. In a data transmission network having a plurality of nodes wherein messages including a header and data are routed from node to node along a transmission route and wherein each node includes processing means for computing a routing algorithm by using the header of a message received by said node and routing said message to another node by using the resulting information, a main memory for storing said message and a cache memory (10); a method of utilizing the cache memory comprising the steps of:

(a) reading the location in a cache tag ram (12) indexed by a portion of the address of said main memory address at which the message is to be stored so as to determine whether a location in said cache memory corresponding to said portion of said address is free in order to store the header of said message in the cache cell of said cache memory at the location corresponding to said portion of said address when said location is free and storing said header in said cache memory while said header is being stored in said main memory, (b) reading said header from said cache memory in order to compute said routing algorithm, (c) writing a new header resulting from said routing algorithm into said cache memory, (d) reading said new header from said cache memory and the message data stored in said main memory to enable the routing of a message including said header and said message data over the network; and, (e) in the event that said "determine whether said location is free" step determines that said location is not free, then ending the cache process to store the header in the cache.

17. A method for caching an IP header in cache memory at network node substantially concurrently with the storage of the deader in main memory at the network node where the main memory location is identified by a main memory address, said method comprising the steps of:

a) examining a message as it is received at the network node for the purpose of determining tentatively whether the message conforms to requirements for an IP header;

b) where the message has been determined tentatively to conform to the requirements of an IP header, retrieving the contents of a cache tag RAM to determine whether an associated cache memory cell is available for storage of the header; and c) if the message conforms to the requirements of an IP header and the associated cache memory cell is available, writing the message concurrently into the associated cache memory cell and the main memory; and, d) ending the process to store the header in the cache in the event that step "c" determines that the cache memory cell is not available.

18. Computer readable media, comprising:

said computer readable media having instructions for execution in a node written thereon for the practice of the method of claim 12.

19. Electromagnetic signals propagating on a computer network, comprising:

said electromagnetic signals carrying information for execution in a node for the practice of the method of claim 12.

* * * * *